Feb. 21, 1939.  J. R. MADEIRA  2,147,908
BELT CONVEYER
Filed Aug. 16, 1937   2 Sheets-Sheet 1
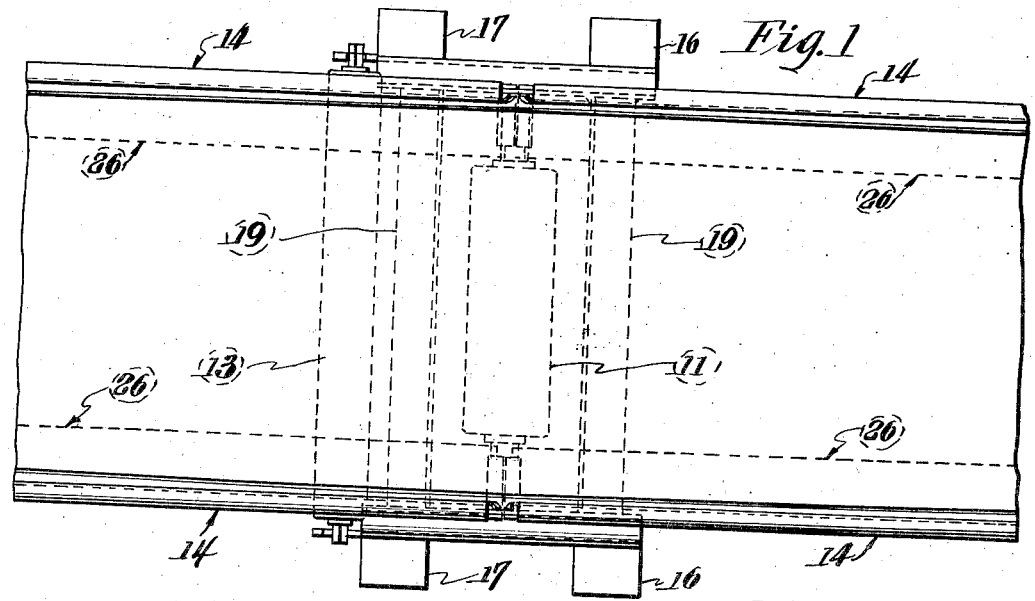
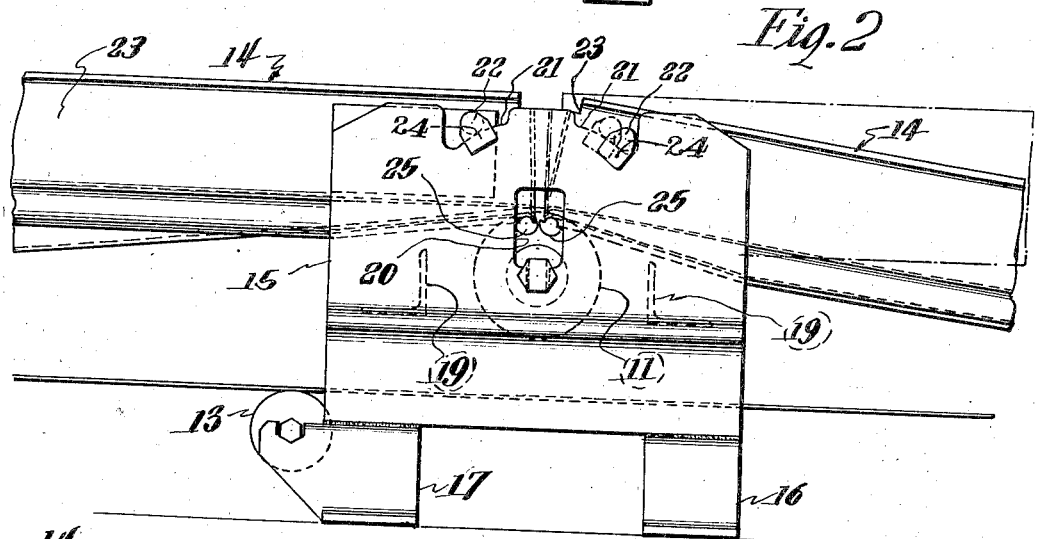
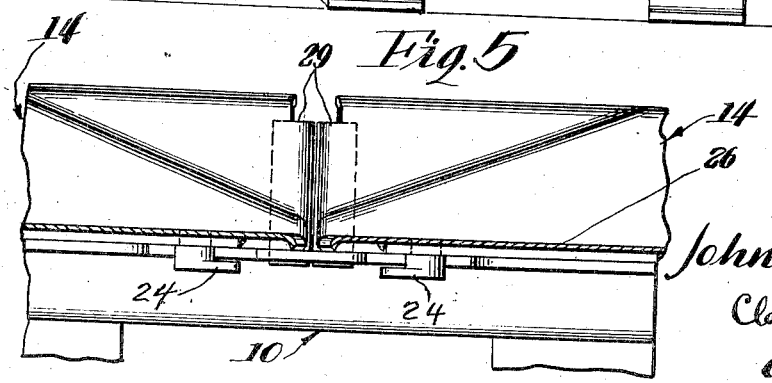
Inventor
John R. Madeira
Clarence F. Poole
Attorney Feb. 21, 1939.  J. R. MADEIRA  2,147,908
BELT CONVEYER
Filed Aug. 16, 1937    2 Sheets-Sheet 2
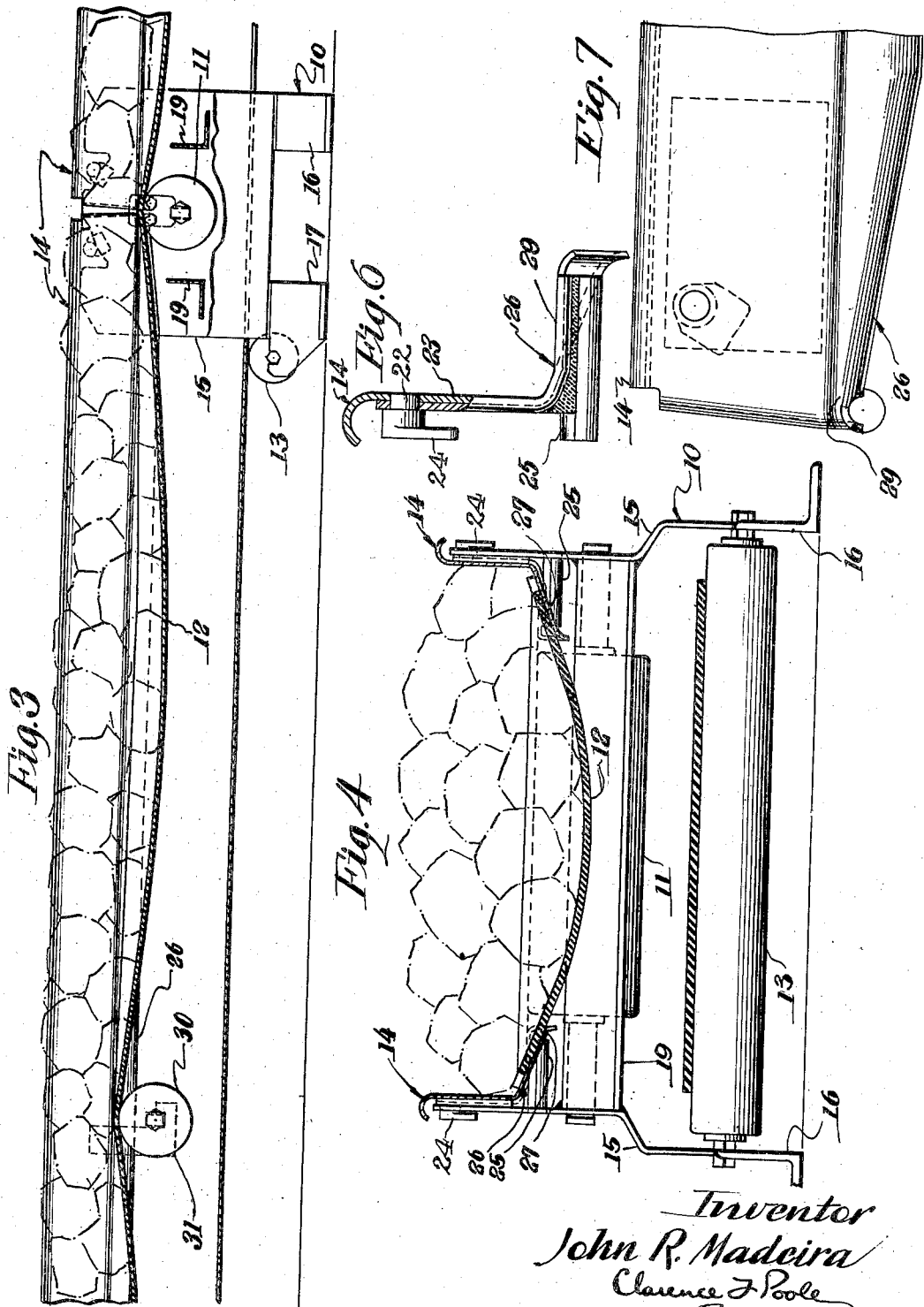
Inventor
John R. Madeira
Clarence F. Poole
Attorney Patented Feb. 21, 1939

2,147,908

UNITED STATES PATENT OFFICE 2,147,908

BELT CONVEYER

John R. Madeira, Chicago, Ill., assignor to Goodman Manufacturing Company, Chicago, Ill., a corporation of Illinois Application August 16, 1937, Serial No. 159,259

12 Claims. (Cl. 198—204)

This invention relates to improvements in belt conveyers and more particularly to improvements in a sectional belt conveyer of the flat belt type adapted for use in mines.

Flat belt conveyers of the sectional type used in mines underground usually consist of a series of spaced apart aligned supporting standards forming a support for the rollers for the upper and lower runs of the belt, and spacing members extending between these supporting standards for holding them in spaced relation with respect to each other. Said spacing members usually extend upwardly along the sides of the belt to retain material thereon and may have portions extending beneath the belt, commonly called spill plates, which support the edges of the belt and serve to prevent material from spilling from the belt onto its lower run. These spill plates usually extend inwardly from the upright sides of the spacing members in a substantially horizontal direction such as is shown in a prior Patent No. 2,105,889, which issued to me on Jan. 18, 1938, although in some cases they have been inclined downwardly from the spacing members towards the longitudinal center of the conveyer in a manner similar to that shown in a prior Patent No. 1,850,891 which issued to T. G. Nyborg on March 22, 1932.

When the belt is loaded with material such as coal, the weight of the coal, between the belt supporting rollers, will cause it to sag at its center and acquire a trough shaped formation, while it will be flat as it passes over said belt supporting rollers. Thus when the spill plates extend horizontally inwardly towards the center of the belt for the entire length of the spacing members, the edges of a heavily loaded belt will raise above the spill plates which will permit fine material to get under the edges of the belt and work between the spill plates and under side of the upper run of the belt. This will cause wear of the belt and working of the fine material under the edges of the belt onto the lower run of the belt and will increase the load on the conveyer, and clog the idler rollers at the tail end of the belt. When these spill plates are inclined to conform to the shape of the belt when loaded, the belt will flatten out when it comes in contact with the idler rollers at the junction point between the conveyer sections which will raise the edges of the belt above the spill plates at this point. Material tends to collect in this gap between the edges of the belt and spill plates and fall onto the lower run of the belt at the junction point of adjacent spill plates.

These conveyers have also been made adjustable, to conform to an uneven bottom, or varying grades in the mine. When so arranged, it has been necessary to provide considerable gap between adjacent ends of the spacing members and spill plates to permit this adjustment. Fine material on the belt, spilling through these gaps, falls onto the lower run of the belt and collects to such an extent as to clog the idler rollers and cause wear of the belt.

The principal objects of my invention are to remedy these difficulties by forming the spill plates to conform to the shape of the belt, both between the idler rollers and when passing over the idler rollers, and by mounting these spacing members on their supporting standards in such a manner as to minimize the gap between adjacent ends of the spacing members and render these gaps substantially constant when said spacing members are adjustably moved with respect to each other, to permit the conveyer to conform to an uneven bottom.

Other objects of my invention will appear from time to time as the accompanying specification proceeds.

My invention may be more clearly understood with reference to the accompanying drawings wherein:

Figure 1 is a fragmentary plan view of a sectional conveyer constructed in accordance with my invention;

Figure 2 is a side elevation of the device shown in Figure 1, drawn to an enlarged scale, showing one section inclined with respect to the other;

Figure 3 is a longitudinal sectional view of the conveyer illustrating the shape the belt will take when in a loaded condition;

Figure 4 is an enlarged transverse sectional view of the conveyer, showing the trough shaped formation of the belt between supporting rollers when loaded;

Figure 5 is an enlarged detail fragmentary plan view of adjoining ends of a pair of spacing members connected to a supporting standard with certain parts shown in section, showing certain details of the spacing members at the junction point thereof;

Figure 6 is an enlarged detail end view of one of the spacing members with certain parts in section in order to show certain details of construction thereof; and Figure 7 is an enlarged detail side elevation of the inside of one of the spacing members showing in detail the form of the spill plate at the end of said spacing member.

In the embodiment of my invention illustrated in the drawings, a transverse supporting standard 10 is provided. Said standard forms a support for a transversely disposed idler roller 11 over which the upper run of a conveyer belt 12 rides and for a transversely disposed idler roller 13, over which the lower run of said conveyer belt rides. Said supporting standard has adjacent ends of parallel spaced spacing members 14, 14 adjustably connected thereto on opposite sides thereof for axial movement with respect thereto in a vertical plane to permit the conveyer to conform to an uneven bottom. A number of said supporting standards are provided and these standards, held in spaced relationship with respect to each other by said spacing members, form a belt supporting structure which may be extended to any practical length by the connection of additional supporting standards and spacing members in the conveyer line.

Each supporting standard 10 includes a pair of parallel spaced upstanding side frame members 15, 15, herein shown as being mounted on angle irons 16, 16 and 17, 17 which are adapted to rest on the ground. Said angle irons each have outwardly extending legs which form feet or a base for said standards. Said side frame members, as herein shown, are connected together by means of a pair of spaced transversely disposed angle irons 19, 19. The vertical legs of each pair of angle irons 17, 17 have a longitudinally extending outward projection which is notched at its upper side to form a support for the idler roller 13.

The idler roller 11 is mounted between said upright sides adjacent the central portion thereof in suitable slots formed in the sides thereof and opening into apertures or openings 20, 20 in said sides to permit ready removal of said rollers. Said openings are located substantially at the transverse central portion of said sides beneath the top thereof and are herein shown as being rectangular in form.

Referring now in particular to the novel form of adjustable supporting connection between said spacing members and supporting standards, the upper portion of each upstanding side 15 is recessed or cut away on each side of the center thereof. The upper surfaces of these cut away portions are of an arcuate formation and extend downwardly away from the center of said upstanding sides towards the ground to form a pair of spaced arcuate supporting surfaces 21, 21 on which the spacing members 14, 14 are supported and along which they may slide. Said supporting surfaces are adapted to be engaged by and form a supporting bearing surface for bearing members 22, 22 extending outwardly from adjacent ends of upright sides 23, 23 of the spacing members 14, 14. A projection 24 depends from the outer ends of each of said bearing members and serves to retain said spacing members on said standards.

The ends of said spacing members are held in relatively close relation with respect to each other during movement of said spacing members along the supporting surfaces 21, 21 by means of reaction members 25, 25 which extend across the bottom of the ends of said spacing members and project outwardly therefrom. The laterally projecting portions of said reaction members extend within and are adapted to bear against the inner vertical sides of the opening 20. Said reaction members bear against said sides when said spacing members are slidably supported on the surfaces 21, 21, the centers of the arcs of which are substantially at the pivotal centers of said reaction members. Said reaction members react against the sides of said openings and form individual rocking centers for said spacing members, and hold the adjacent ends of opposite pairs of said spacing members from spreading apart during pivotal movement of said spacing members with respect to each other.

The reaction members 25, 25 thus prevent adjacent ends of the lower portion of said spacing members from spreading apart and hold said spacing members in such relation with respect to each other that the gap between the ends of said spacing members will be substantially the same for all positions of adjustment of said spacing members with respect to each other, which gap may be so small as to readily clog with loose material to prevent the spillage of additional material through said gap, and still permit a relatively large range of movement of said trough sections with respect to each other.

Referring now in particular to certain other novel features of the invention and the construction of the spacing members 14, 14, a member 26 extends inwardly from the lower end of the upright side 23 of each spacing member. Said member extends along the under side of the edges of the upper run of the belt and forms a support therefor. This member will hereinafter be referred to as a spill plate and, while herein shown as being formed integral with the upright side 23, may be a separate piece secured to said side if desired.

In looking at Figures 3 and 4, which show the belt in a loaded condition, it may readily be seen that material on the belt causes it to assume a trough shaped formation in transverse section between the belt supporting rollers. The spill plates 26, 26 between the idler rollers 11, 11 are inclined downwardly towards the center of the conveyer to conform substantially to the form of said belt when loaded, as is indicated by reference character 27 in Figure 4. As said belt approaches the idler roller 11 and rides over said idler, it flattens out in an obvious manner. Said spill plates are, accordingly, gradually inclined upwardly towards their ends to extend in a substantially horizontal direction from the sides 23, 23 adjacent said idler rollers, as is indicated by reference character 29 in Figures 5, 6, and 7.

It may thus be seen that said spill plates are formed to conform to the trough shaped formation of the belt between the rollers 11, 11, and that these spill plates flatten out at their ends adjacent the belt supporting rollers to conform to the form of the belt as it approaches and passes over said rollers in order to prevent the formation of gaps between the edges of said belt and said spill plates.

The belt 12 is herein shown as being supported intermediate the rollers 11, 11 on a transversely extending idler roller 30. Said idler roller is mounted at its ends in brackets 31, 31 depending from opposite spacing members 14, 14, and its top is disposed beneath the top of the rollers 11, 11 a distance sufficient to permit the sides of said belt to ride along the inclined portion of said spill plates. This arrangement is possible since at this point there is no break in the spill plates 26, 26 adjacent these rollers. It thus permits the belt to conform to the form of said spill plates without making it necessary to incline said spill plates upwardly to a horizontal position at these intermediate rollers, although if desired, the roller 30 and spill plates 26, 26 may be arranged and formed in the same manner as the rollers 11, 11 and said spill plates adjacent said rollers.

It may be seen from the foregoing that a simplified arrangement of sectional conveyer of the flat belt type has been provided which is adapted to conform to an uneven mine bottom and which may readily be assembled or taken apart; that this conveyer is so arranged as to reduce the spilling of material onto the lower run of the belt as it travels across the joints of the conveyer; and that this is attained by forming the spill plates to conform to the form of the belt when loaded as it passes between and over the belt supporting idler rollers, and by pivotally mounting the spacing members on the supporting standards to pivot about a common axis disposed beneath said spacing members so that the distance between adjacent ends thereof will be substantially the same when said members are pivoted with respect to each other, and will be at the minimum requisite to permit pivotal adjustment of said members with respect to each other.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a sectional conveyer, an endless flat conveyer belt, a plurality of supporting standards and longitudinally extending spacing members connecting said standards together, a belt supporting idler roller mounted in each of said standards and extending transversely of said spacing members at the junction point thereof, said spacing members forming sides extending along said belt and having portions extending beneath and supporting the edges of said belt to prevent the spillage of material onto the lower run of the belt, said belt when loaded being of a trough shaped formation between said idler rollers and said belt supporting portions being inclined intermediate said idler rollers to conform to the trough shaped section of said belt, the inclined portion thereof gradually diminishing and becoming horizontal at the ends of said spacing members to conform to the form of said belt as it passes over said idler rollers in a relatively flat condition.

2. In a sectional conveyer, in combination, a plurality of spaced apart supporting standards, longitudinally extending spacing members connecting said standards together, a relatively flat belt supporting idler roller mounted in each of said standards and extending transversely of said spacing members at the junction points thereof, an endless flat conveyer belt adapted to be trained between said spacing members and over said rollers, said spacing members forming sides extending along said belt and having spill plates extending beneath and supporting the edges of said belt to prevent the slippage of material onto the lower run of the belt, the portion of said spill plates adjacent said idler rollers being substantially parallel to the engaging surface of said idler rollers, and the portion of said spill plates intermediate said idler rollers being inclined downwardly with respect to the horizontal, to conform to the form of said belt when loaded as it travels along said spacing members between said supporting standards.

3. In a sectional conveyer, in combination, a plurality of spaced apart supporting standards, longitudinally extending spacing members connecting said standards together, a relatively flat belt supporting idler roller mounted in each of said standards and extending transversely of said spacing members at the junction points thereof, a lower idler roller mounted in each of said standards for supporting the lower run of the belt, an endless flat conveyer belt having an upper run adapted to be trained over said upper idler rollers and a lower return run adapted to be trained over said lower idler rollers, the form of said belt between said upper idler rollers when loaded being of a substantially trough shaped formation and being flat as it passes over said upper idler rollers, said spacing members forming sides extending along the edges of said belt and having belt supporting portions extending beneath and supporting the edges of said belt to prevent the spillage of material onto the lower run of the belt, said belt supporting portions being inclined downwardly toward the center of said conveyer intermediate said idler rollers to conform to the trough shaped formation of said belt, and gradually approaching the horizontal at the ends of said spacing members to conform to the form of said belt as it passes over said idler rollers in a relatively flat condition.

4. In a sectional conveyer, an endless flat conveyer belt, a plurality of supporting standards, longitudinally extending spacing members connecting said standards together, a belt supporting idler roller mounted in each of said standards and extending transversely of said spacing members at the junction point thereof, said spacing members forming sides extending along said belt and having portions extending beneath and supporting the edges of said belt to prevent the spillage of material onto the lower run of the belt, and pivotal connections between adjacent ends of said spacing members and said standards to permit said conveyer to conform to an uneven bottom, said connections being so arranged as to hold said spacing members from spreading apart when said spacing members are inclined with respect to each other and including a pair of abutting reaction members on adjacent spacing members and engaging said associated standard.

5. In a sectional conveyer, an endless flat conveyer belt, a plurality of supporting standards, longitudinally extending spacing members connecting said standards together, a belt supporting idler roller mounted in each of said standards and extending transversely of said spacing members at the junction point thereof, said spacing members forming sides extending along said belt and having portions extending beneath and supporting the edges of said belt to prevent the spillage of material onto the lower run of the belt, and sliding connections between adjacent ends of said spacing members and said standards to permit said conveyer to conform to an uneven bottom, and means engaging said supporting standards and forming individual centers about which said spacing members pivot.

6. In a sectional belt conveyer adapted to conform to an irregular mine bottom, an endless flat conveyer belt, a series of spaced apart supporting standards, a plurality of pairs of longitudinally extending spacing members connecting said standards together, said standards including a pair of parallel spaced upright side walls having arcuate supporting surfaces on the upper sides thereof, and having openings beneath said supporting surfaces, said spacing members having slidable engagement with said supporting surfaces at their ends, and means extending from the ends of said spacing members reacting against the inner sides of said openings.

7. In a sectional belt conveyer adapted to conform to an irregular mine bottom, an endless flat conveyer belt, a series of spaced apart supporting standards, a plurality of pairs of longitudinally extending spacing members connecting said standards together, said standards including a pair of parallel spaced upright side walls, each of said side walls having arcuate longitudinally extending supporting surfaces on opposite sides of the center thereof and having a centrally disposed opening beneath said supporting surfaces, means projecting from said spacing members having slidable engagement with said supporting surfaces, and other means projecting from said spacing members reacting against the insides of said opening, permitting said spacing members to pivot with respect to said standards about spaced apart axes disposed adjacent the ends of said spacing members.

8. In a sectional belt conveyer adapted to conform to an irregular surface, an endless flat conveyer belt, a series of spaced apart supporting standards, a plurality of pairs of longitudinally extending spacing members connecting said standards together, said standards including a pair of parallel spaced upright side walls, each of said side walls having arcuate longitudinally extending supporting surfaces on opposite sides of the center thereof, the arcs of which are generated about a common axis disposed beneath said spacing members, and also having a centrally disposed opening beneath said supporting surfaces, means projecting from said spacing members having slidable engagement with said supporting surfaces to support said spacing members on said supporting surfaces for pivotal movement with respect to each other, and other means projecting from the lower ends of said spacing members and reacting against the insides of said opening to prevent spreading of said spacing members during pivotal movement thereof.

9. In a sectional belt conveyer adapted to conform to an irregular surface, an endless flat conveyer belt, a series of spaced apart supporting standards, a plurality of pairs of longitudinally extending spacing members connecting said standards together, said spacing members forming sides extending along said belt and having spill plates beneath and supporting the edges of said belt to prevent the spillage of material onto the lower run of the belt, each of said standards including a pair of parallel spaced upright side walls, each of said side walls having arcuate longitudinally extending supporting surfaces on opposite sides of the center thereof and having a centrally disposed opening disposed beneath said supporting surfaces, means projecting from the upper portion of said spacing members having slidable engagement with said supporting members, and other means projecting from the lower portion of said spacing members having bearing engagement with the insides of said opening, and maintaining the distance between the ends of said spill plates in close relation with respect thereto when said spill plates are inclined with respect to each other.

10. In an extensible flat belt conveyer adapted to conform to an irregular surface, a plurality of belt supporting standards and longitudinally extending spacing members detachably connecting said standards together, an idler roller mounted in each of said standards for supporting the upper run of the belt, said spacing members forming sides extending along said belt and having spill plates extending inwardly beneath and supporting the edges of said belt to prevent the spillage of material onto the lower run of the belt, said spill plates being inclined downwardly towards the center of said conveyer intermediate said idler rollers and being substantially horizontal at the ends of said spacing members to conform to the form of the upper surface of said idler rollers, and supporting pivotal connections between said supporting standards and the ends of said spacing members arranged to maintain the gaps between the ends of said spill plates at a minimum and substantially constant when said spacing members are inclined with respect to each other.

11. In an extensible flat belt conveyer adapted to conform to an irregular surface, a plurality of belt supporting standards and longitudinally extending spacing members detachably connecting said standards together, an idler roller mounted in each of said standards for supporting the upper run of the belt, said spacing members forming sides extending along said belt and having spill plates extending inwardly beneath and supporting the edges of said belt to prevent the spillage of material onto the lower run of the belt, said spill plates being inclined downwardly towards the center of said conveyer intermediate said idler rollers and being substantially horizontal at the ends of said spacing members to conform to the form of the upper surface of said idler rollers, and pivotal supporting connections between said supporting standards and the ends of said spacing members, arranged to maintain the gaps between the ends of said spill plates at a minimum and substantially constant when said spacing members are inclined with respect to each other including longitudinally extending arcuate supporting surfaces on each side of said supporting standards, said supporting surfaces being on opposite sides of the transverse center of said supporting standards, and said supporting standards being provided with centrally disposed openings arranged beneath said supporting surfaces, said spacing members being slidably supported on said supporting surfaces and having means engaging and reacting against the sides of said openings to hold said spacing members from spreading upon pivotal movement thereof.

12. In an extensible flat belt conveyer adapted to conform to an irregular surface, a plurality of belt supporting standards and longitudinally extending spacing members detachably connecting said standards together, an idler roller mounted in each of said standards for supporting the upper run of the belt, said spacing members forming sides extending along said belt and having spill plates extending inwardly beneath and supporting the edges of said belt to prevent the spillage of material onto the lower run of the belt, said spill plates being inclined downwardly towards the center of said conveyer intermediate said idler rollers and being substantially horizontal at the ends of said spacing members to conform to the form of the upper surface of said idler rollers, and pivotal connections between said supporting standards and the ends of said spacing members arranged to maintain the gaps between the ends of said spill plates to a minimum and substantially constant when said spacing members are inclined with respect to each other including longitudinally extending arcuate supporting surfaces on each side of said supporting standards, said supporting surfaces being on opposite sides of the transverse center of said supporting standards and said supporting standards being provided with centrally disposed openings arranged beneath said supporting surfaces, means projecting laterally outwardly from the upper side of said spacing members having slidable engagement with said supporting surfaces, and other means projecting from the lower ends of said bearing members reacting against the insides of said openings to hold said spacing members from spending upon pivotal adjustment of said spacing members with respect to each other.

JOHN R. MADEIRA.

CERTIFICATE OF CORRECTION.

Patent No. 2,147,908. February 21, 1939.

JOHN R. MADEIRA.

It is hereby certified that error appears in the printed specification of the above numbered patent requiring correction as follows: Page 5, second column, line 6, claim 12, for the word "spending" read spreading; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.